United States Patent
Maxwell

[15] 3,697,754
[45] Oct. 10, 1972

[54] CONTAINER FILL WEIGHT MONITORING SYSTEM

[72] Inventor: Milton Maxwell, Livingston, N.J.
[73] Assignee: Colgate-Palmolive Company, New York, N.Y.
[22] Filed: April 17, 1969
[21] Appl. No.: 817,067

[52] U.S. Cl. ............................................. 250/83.3
[51] Int. Cl. ................................................ G01t 1/16
[58] Field of Search ............................... 250/83.3 D

[56] References Cited

UNITED STATES PATENTS 2,920,207   1/1960   Powell ...................... 250/83.6
3,001,076   9/1961   Crump .................. 250/83.3 X
3,489,901   1/1970   Brown ...................... 250/83.3

Primary Examiner—James W. Lawrence
Assistant Examiner—Davis L. Willis
Attorney—Herbert S. Sylvester, Murray M. Grill, Norman Blumenkopf, Ronald S. Cornell, Thomas J. Corum, Richard N. Miller and Robert L. Stone

[57] ABSTRACT

An apparatus for monitoring the mass or weight of consecutive individual containers moving on a conveyor unit including radiation means spaced from a conveyor unit for subjecting filled containers to a field of nuclear radiation. Suitable detection means detect the amount of radiation not absorbed by the filled containers and correlate this with the fill weight which is then translated to an electrical signal and fed to suitable recording means.

5 Claims, 7 Drawing Figures

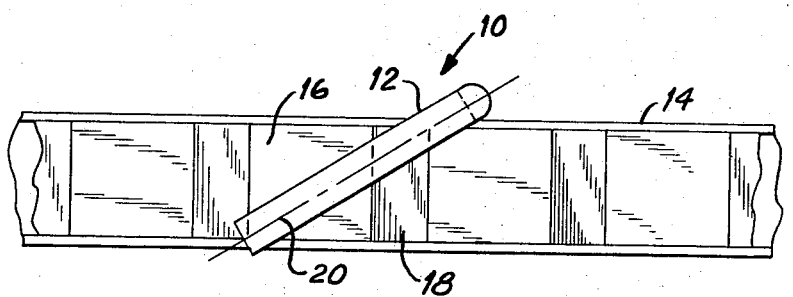
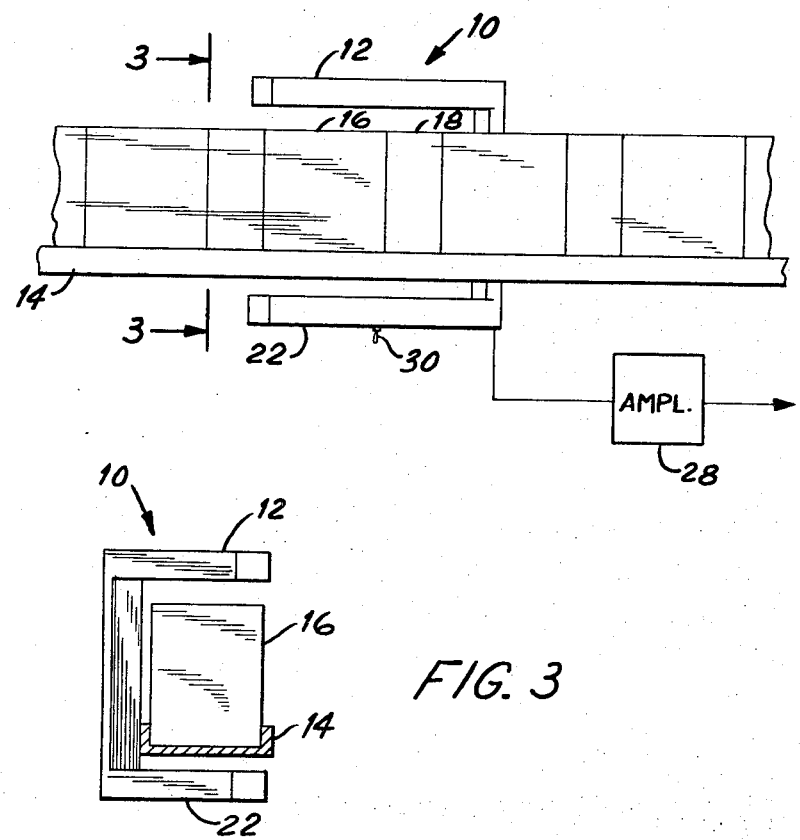

CONTAINER FILL WEIGHT MONITORING SYSTEM

This invention relates to a method and apparatus for automatically monitoring the mass or weight of a quantity of filler material contained in individual spaced filled containers moving on a conveyor belt unit. More particularly, the invention relates to a method of indirectly measuring and/or controlling the trend of the mass or weight of a stream of discrete, spaced, individually contained portions of material as a function of the amount of nuclear radiation absorbed by the filled container.

For obvious reasons, both the consumer and the packager are concerned with the weight of a container's contents. Considerable amounts of time, money and effort have been spent by packagers developing automatic dispensing machines for filling empty containers with a specified quantity of material. Although the average weight of the contents of a large number of containers will fall within the limits prescribed by Federal and local laws, the statistical sampling must include some filled containers of weights outside these limits.

A recent innovation in weight measuring techniques for spaced filled containers moving on a conveyor unit involves subjecting the package to a field of nuclear radiation (using for example, gamma rays) and the measurement of the amount of radiation absorbed by the package as a function of its mass or weight. Spaced containers filled with preset portions of material dispensed by an automatic measuring device move on a conveyor belt and pass a source of radiation located above and perpendicular to the stream of motion of the containers. A radiation detecting unit is placed below the containers and parallel to the source so that when an individual container passes through the field of radiation, the amount of radiation absorbed by the container and its contents will appear as an amplified pulsating electrical output signal on a meter or other means responsive to changes in voltage or current, depending upon the measuring system.

It is the primary object of the present invention to provide a continuous signal weight monitoring system for use on a conveyor unit which will represent the trend in the quantity of material being dispensed into individual containers moving as part of a stream from an automatic dispensing machine.

It is another object of this invention to provide an automatic container fill weight monitoring system for use on a conveyor unit which will compensate for spacing between containers on the conveyor belt and provide continuous non-pulsating output data representing the average container fill weight, which data does not have to be corrected for weight fluctuations of successive containers.

It is a further object of the invention to provide an automatic container fill weight monitoring system which provides continuous non-pulsating output data representing the true average of the fill weights of individual containers moving in a stream on a conveyor unit, which data does not have to be corrected for instances where an occasional container is empty or missing from its expected location in the stream.

In accordance with the objects of this invention, there is provided a method and means for accurately monitoring the mass or weight of filler material placed in successive containers moving on a conveyor unit by a dispensing machine engaged in a continuous filling process. A container fill weight monitoring unit utilizing a nuclear radiation source, preferably gamma radiation, and detector provides a continuous non-pulsating electrical output which can be translated in terms of the average container fill weight to emphasize weight trends which can be controlled by suitable means.

More particularly, these objectives are accomplished by placing consecutive filled containers on a conveyor unit which, as it moves, causes the filled containers to pass through a field of nuclear radiation. The nuclear radiation source and detector are of the same dimensions and lie parallel to one another in a plane passing through more than one container with the source being disposed in a plane parallel to a surface of the containers passing through the field of radiation and the detector being disposed in a plane parallel to the opposite surface. One end of the source must be advanced in the direction of movement of the stream of containers with respect to its other end. The source of nuclear radiation comprises an elongated strip of radioactive material and is called a strip source. The consecutive containers may be arranged so that their sides abut one another or they can be spaced at equal intervals, optionally placing a block of solid material, such as wood or lead, therebetween. For example, the source and detector may be spaced from one another in a plane passing through the diagonal of the rectangle formed by the plan view of at least one container plus one space or block or several containers. A portion of the field of radiation emitted by a strip source that passes through a filled container is absorbed by it with the remainder being transmitted to the detector where it is translated to a flow of electric current that can be correlated with the weight of the container's contents. If a block of material is used, a constant portion of the field of radiation will be absorbed by the block, and therefore, the magnitude of the current "seen" by the detector will be altered by a constant factor and the presence of the block can be disregarded. Since the volume of filled container and space or block cut by the field of radiation is fixed by the alignment of the source and detector, the signal transmitted to suitable recording means is continuous and non-pulsating. The use of a block has the advantage of eliminating the possibility of circuit saturation which could injure the various external electronic elements.

Still further objects and features of this invention reside in the provision of a weight measuring and control system for filled containers moving on a conveyor belt which is utilizable for containers of any convenient size or shape, which requires a lower cost of installation as compared to other weight measuring mechanisms because of the elimination of the need to break the conveyor belt line, which increases profits to the packager and the like.

These, together with the various ancillary objects and features of this invention, which will become apparent as the following description proceeds, are attained by this container fill weight monitoring system, preferred embodiments of which have been illustrated in the accompanying drawings, by way of example only, wherein:

FIG. 1 is a fragmentary top plan view of a conveyor unit with a stream of consecutive filled containers spaced by blocks of solid material moving thereon, showing a source of nuclear radiation mounted above the moving stream of containers and its diagonal alignment with respect to the stream in accordance with the concepts of the present invention;

FIG. 2 is a fragmentary elevational view of a conveyor unit and a stream of consecutive filled containers spaced by blocks moving thereon, showing a manner in which the source of nuclear radiation and the detector may be mounted respectively, above and below the conveyor unit;

FIG. 3 is a vertical sectional view of the container fill weight monitoring system looking along the plane of line 3—3 in FIG. 2;

Figure 5:
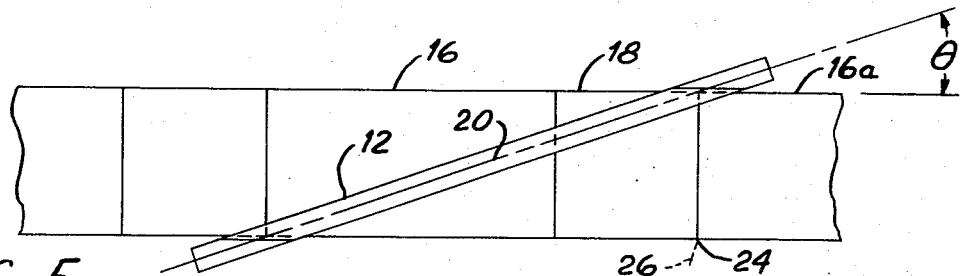
FIG. 5 is a diagrammatic view of a particular alignment of the nuclear radiation source with respect to the moving stream of consecutive filled containers and spacer blocks.
Figure 6:
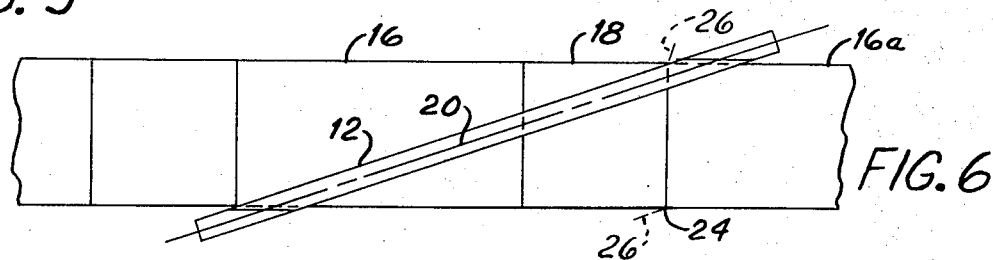
Figure 7:
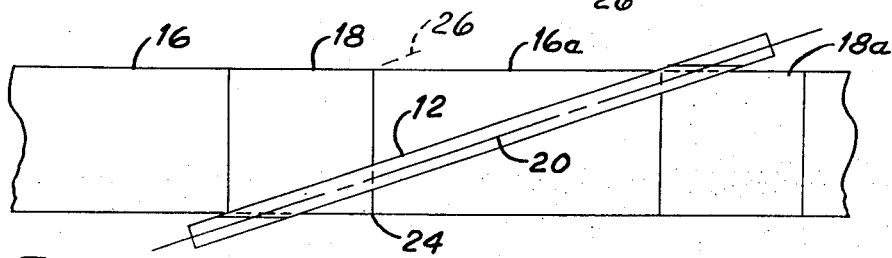

FIG. 6 is a diagrammatic view similar to FIG. 5 showing the displacement of the moving stream of spaced, filled containers from its position with respect to the stationary nuclear radiation source as shown in FIG. 5; and, FIG. 7 is a diagrammatic view similar to FIG. 6 showing further displacement of the moving stream of containers from its position with respect to the stationary nuclear radiation source.

With continuing reference to the accompanying drawings, particularly to the embodiment shown in FIGS. 1–3, wherein like reference numerals designate similar parts throughout the various views, reference numeral 10 is used to generally designate the nuclear radiation source-detector unit of this invention. Source-detector unit 12 is generally "C-shaped" and comprises a strip source of nuclear radiation 12 having suitable radioactive material distributed along its length. As shown, the source 12 may be located above the conveyor unit 14 and spaced from a moving stream of filled containers or cartons 16 separated by lead spacer blocks 18 carried by conveyor unit 14. Radiation source 12 is aligned with respect to the stream of spaced filled containers 16 so that its center line 20 is the diagonal of a rectangle congruent with a rectangle formed by one filled container and its adjacent lead spacer block 18. A radiation detecting device 22 is located beneath the conveyor unit 14 and parallel to source 12.

Referring now to FIGS. 5, 6 and 7, as the stream of containers 16 and spacer blocks 18 moves through the field of nuclear radiation, preferably gamma radiation, emanating from a radioactive isotope, such as cesium 137, a portion of container 16a will enter the field of radiation as the corresponding portion of container 16 leaves the radiation field. In like manner, the passage of edge 24 of lead spacer block 18 through the field of radiation can be traced by reference to dotted line 26. Lead spacer block 18a enters the field of radiation as edge 24 leaves it.

It has been found that optimum results are obtained when the field of radiation is caused to pass through one and one half successive containers, e.g., a container plus a block plus one half of a container.

It is to be understood that the above description is not meant to be limitative of the scope of the invention. The source and detecting device may be positioned parallel to one another on opposite sides of the stream of cartons in any plane which passes through more than one container so long as one end of the source is advanced in the direction of movement of the stream of moving filled containers. It is not necessary to separate the containers by blocks or even to space them at all. Consecutive containers may be placed so that similar sides of adjacent containers are in contact. It is further to be understood that the relative positions of the source and detecting device may be reversed. Of course, the conveyor unit can be any unit which advances the stream, such as a side belt directing the containers along fixed rails.

Figure 4:
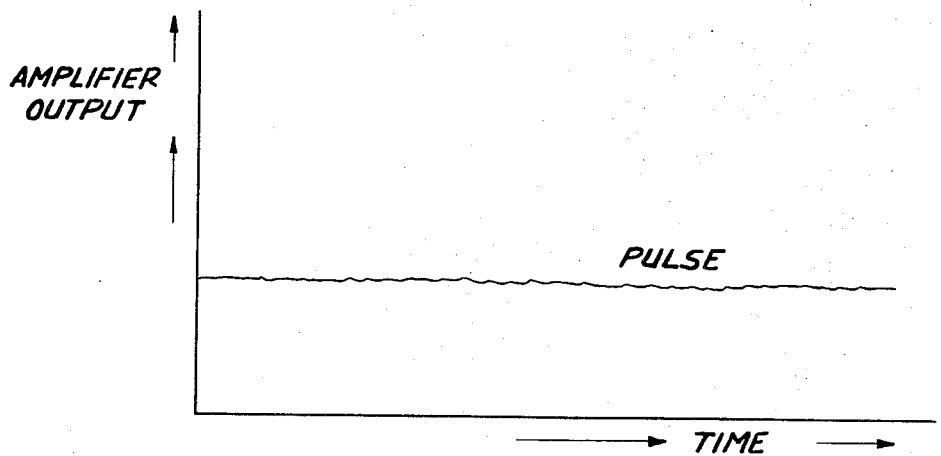
FIG. 4 is a diagram of the continuous, non-pulsating electrical signal provided by a container fill weight monitoring system according to this invention.

Since the angle $\theta$ between the stationary source and stream of spaced filled containers is constant, detector 22 receives radiation through a fixed volume of container 16 and a fixed volume of spacer 18. The portion of radiation passing through lead spacer block 18 is almost completely absorbed by it. A portion of the radiation passing through filled container 16 is absorbed by it with the remainder being transmitted to a sensor, not shown, in the collimated detector 22 where it is translated to a flow of electrical current that can be correlated with the weight of the containers's contents. The magnitude of the current "seen" by the detector 22 is not affected by the presence of the lead spacer block which substantially completely absorbs all of the radiation passing through it so that the amount of radiation impinging upon the detector 22 is virtually entirely due to the radiation not absorbed by filled container 16. The current transmitted to amplifier 28 is effectively constant since there is a minimum amount of discontinuity of radioactive energy transmitted to the detector 22. Hence, the pulse received by suitable recording means, not shown, is continuous and smooth as can be seen in the diagram of FIG. 4.

It is also contemplated to interrupt the detector circuit during the time interval when a container or carton is not located beneath the source of radiation 12 so that corrections do not have to be made to the recorded output data. In one embodiment, this may be accomplished by depressing a "no carton" switch 30 on detector 22 which opens the electrical circuit of the monitoring system. In a similar manner, the monitoring mechanism will "ignore" an occasional empty container passing through the radiation field.

One variation of this invention entails utilizing a plate source and detector of a shape congruent with the rectangle formed by the plan view of one container plus its adjacent spacer block, the source and detector covering this area of the stream at all times. In another embodiment, a strip source is placed at a distance high enough above the stream so that the field of radiation diverging at its source to form an envelope of radiation impinges on the plane of the stream in an area congruent with the rectangle formed by the upper surface of one container and its adjacent spacer block.

The container fill weight monitoring system of this invention may be used to monitor or control the trend of the fill weights of containers of any size or shape or for symmetrically shaped bulk products. Continuous filling line operations may be had, for example, with spray products, powders, pastes, solid cakes, and liquids. It is contemplated that the amplified signal be used to actuate a servomechanism which controls the trend of the container fill weights by adjusting the quantity of material dispensed to empty containers.

I claim:

1. A method of monitoring the average weight of a stream of consecutive individually contained portions of material comprising arranging a fixed volume of a stream of filled containers with said containers being spaced from each other by lead blocks on a conveyor unit, passing said stream of filled containers spaced by lead blocks through a field of nuclear radiation emanating from a source of radiation spaced from said stream in a plane parallel thereto with one end of said source being advanced in the direction of movement of said stream with respect to the other end of said source in an amount sufficient to traverse at least one filled container, said predetermined fixed volume of said stream being a fixed volume of at least one filled container, detecting the amount of radiation absorbed by each successive container by measuring the amount of radiation not absorbed by each successive container, translating said measured amount of radiation to an electrical signal, and then monitoring said electrical signal on recording means.

2. A method according to claim 1, which includes separating said consecutive containers by blocks of solid material and wherein the centerline of said source traverses one and one half containers plus a block.

3. A method according to claim 1, wherein said source of radiation is an elongated strip source spaced from said stream of filled containers spaced by lead blocks and at an acute angle thereto so that the centerline of said source of radiation is the diagonal of a rectangle formed by at least one filled container plus at least one lead block adjacent said filled container.

4. A method according to claim 1, wherein said source of radiation is a rectangular plate source spaced from said stream, said plate subjecting an entire surface of at least one filled container and at least one block adjacent said filled container to a field of nuclear radiation.

5. A method according to claim 1, wherein said source of radiation is a horizontal elongated strip source spaced far enough from said stream for subjecting an entire surface of at least one filled container and at least one block adjacent said filled container to a field of nuclear radiation.

* * * * *